(12) United States Patent
Park et al.

(10) Patent No.: US 10,141,091 B2
(45) Date of Patent: Nov. 27, 2018

(54) MAGNETOPLUMBITE-TYPE FERRITE MAGNETIC MATERIAL AND SEGMENT-TYPE PERMANENT MAGNET DERIVED THEREFROM

(75) Inventors: Kilsoo Park, Pohang-si (KR); Minho Kim, Pohang-si (KR); Dongyoung Lee, Pohang-si (KR)

(73) Assignee: UNION MATERIALS CORPORATION, Daegu (KR)

( * ) Notice: Subject to any disclaimer, the term of this patent is extended or adjusted under 35 U.S.C. 154(b) by 852 days.

(21) Appl. No.: 13/983,799

(22) PCT Filed: May 16, 2012

(86) PCT No.: PCT/KR2012/003853
§ 371 (c)(1),
(2), (4) Date: Aug. 6, 2013

(87) PCT Pub. No.: WO2012/165780
PCT Pub. Date: Dec. 6, 2012

(65) Prior Publication Data
US 2013/0307653 A1 Nov. 21, 2013

(30) Foreign Application Priority Data
May 31, 2011 (KR) ........................ 10-2011-0052109

(51) Int. Cl.
*H01F 1/11* (2006.01)
*C01G 51/00* (2006.01)
*C04B 35/26* (2006.01)
*C04B 35/626* (2006.01)
*C04B 35/64* (2006.01)

(52) U.S. Cl.
CPC ............. *H01F 1/11* (2013.01); *C01G 51/006* (2013.01); *C04B 35/26* (2013.01);
(Continued)

(58) Field of Classification Search
None
See application file for complete search history.

(56) References Cited

U.S. PATENT DOCUMENTS 5,378,384 A    1/1995  Hopstock et al.
6,139,766 A *  10/2000 Taguchi .............. C04B 35/2641
                                                    252/62.57
(Continued)

FOREIGN PATENT DOCUMENTS

EP    1667176 A1    6/2006
KR    10-0359547 B1  10/2002
(Continued)

OTHER PUBLICATIONS

European Patent Office, Communication dated Nov. 26, 2014 issued in corresponding European application No. 12793259.8.
(Continued)

*Primary Examiner* — Xiaowei Su
(74) *Attorney, Agent, or Firm* — Saliwanchik, Lloyd & Eisenschenk

(57) ABSTRACT

A ferrite magnetic material comprising a primary phase of a magnetoplumbite-type hexagonal ferrite, the primary phase having a composition represented by formula (I), can provide improved magnetic properties in terms of the residual magnetic flux density (Br), intrinsic coercive force (iHc), squareness (Hk/iHc), and maximum energy product (B.Hmax). Therefore, a segment-type permanent magnet derived therefrom can be used in the manufacture of small type motors for automobiles, motors for electric equipments as well as for home appliances, and other devices.

3 Claims, 12 Drawing Sheets

RIGHT SIDE VIEW

THREE-DIMENSIONAL VIEW

(52) U.S. Cl.
CPC ...... *C04B 35/6261* (2013.01); *C04B 35/6262* (2013.01); *C04B 35/62625* (2013.01); *C04B 35/62645* (2013.01); *C04B 35/62685* (2013.01); *C04B 35/64* (2013.01); *C01P 2004/61* (2013.01); *C01P 2006/42* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3241* (2013.01); *C04B 2235/3262* (2013.01); *C04B 2235/3275* (2013.01); *C04B 2235/3279* (2013.01); *C04B 2235/3284* (2013.01); *C04B 2235/3298* (2013.01); *C04B 2235/5436* (2013.01); *C04B 2235/5445* (2013.01); *C04B 2235/604* (2013.01); *C04B 2235/606* (2013.01); *C04B 2235/661* (2013.01); *C04B 2235/767* (2013.01)

(56) References Cited

U.S. PATENT DOCUMENTS

| | | |
|---|---|---|
| 6,811,718 B2 | 11/2004 | Morel et al. |
| 2001/0023933 A1 | 9/2001 | Ogata et al. |
| 2009/0218540 A1* | 9/2009 | Takami ............ C01G 49/0018 252/62.57 |
| 2009/0261288 A1 | 10/2009 | Hosokawa et al. |
| 2009/0314981 A1* | 12/2009 | Yanagida ............ C04B 35/2633 252/62.55 |
| 2012/0161910 A1* | 6/2012 | Nagaoka ............ C04B 35/2633 252/62.57 |

FOREIGN PATENT DOCUMENTS

| | | |
|---|---|---|
| KR | 10-0870690 B1 | 11/2008 |
| WO | WO 2008/105449 A1 | 9/2008 |
| WO | 2011/004791 A1 | 1/2011 |

OTHER PUBLICATIONS

Intellectual Property Tribunal 8th Panel Decision of KR-10-2011-0052109 (including an English translation), dated Nov. 28, 2014 (40 pages).†
Intelleclual Property Tribunal 8th Panel Decision of KR-10-2011-0052109 (including an English translation), dated Nov. 28, 2014.†

\* cited by examiner
† cited by third party

RIGHT SIDE VIEW

THREE-DIMENSIONAL VIEW

FRONT VIEW

CROSS-SECTIONAL VIEW

MAGNETOPLUMBITE-TYPE FERRITE MAGNETIC MATERIAL AND SEGMENT-TYPE PERMANENT MAGNET DERIVED THEREFROM

CROSS REFERENCE TO RELATED APPLICATIONS

This application is a National Stage of International Application No. PCT/KR2012/003853 filed May 16, 2012, claiming priority based on Korean Patent Application No. 10-2011-0052109 filed May 31, 2011, the contents of all of which are incorporated herein by reference in their entirety.

TECHNICAL FIELD

The present invention relates to a magnetoplumbite-type (hexagonal) ferrite magnetic material having improved magnetic properties, and a segment-type permanent magnet derived therefrom which is used in the manufacture of small type motors for automobiles, motors for electric equipments as well as for home appliances, and other devices.

BACKGROUND ART

Sintered ferrite magnets having a magnetoplumbite-type (M-type) crystal structure are employed as permanent magnets which are the core components of small type motors for automobiles, and motors for electric equipments/home appliances.

Conventional M-type Sr- or Ba-based sintered ferrite magnets are generally prepared by the following procedures; First, an iron oxide is mixed with a carbonate of Sr or Ba, and the mixture is subjected to a reaction to form $SrO \cdot nFe_2O_3$ or $BaO \cdot nFe_2O_3$ by calcination. The resulting calcined material is pulverized to obtain a coarse powder. The coarse powder is mixed with a sintering aid such as $SiO_2$, $SrCO_3$, and $CaCO_3$, and then wet pulverized to obtain a slurry of a fine powder having a uniform particle size. For the purpose of enhancing the magnetic properties such as the intrinsic coercive force (iHc) of the final product, $Cr_2O_3$ or $Al_2O_3$ is added to the fine powder slurry together with the sintering aid. The resulting fine powder slurry is molded using a pressing apparatus under a magnetic field, dried, sintered and processed to prepare a magnet with a desired shape.

Recently, improved performance characteristics and higher efficiency are required of automobiles, electric apparatus, and home appliances. To meet such demand, there have recently been conducted many studies to develop a permanent magnet having improved magnetic properties in terms of the residual magnetic flux density (Br), intrinsic coercive force (iHc), squareness (Hk/iHc), and maximum energy product (B.Hmax).

For example, European Patent Laid-Open Publication No. 0905718 discloses a sintered magnet comprising a primary phase of a hexagonal ferrite containing A, R, Fe, and M, which is represented by $A_{1-x}R_xFe_{12-y}M_yO_{19}$, wherein A is at least one element selected from the group consisting of strontium, barium, calcium, and lead, with strontium being essentially contained in A; R is at least one element selected from rare earth elements including lanthanum, bismuth, and yttrium, with lanthanum being essentially contained in R; M is cobalt or a mixture of cobalt and zinc (the proportion of cobalt in M is at least 10 atomic %); and the proportions of A, R, Fe and M elements with respect to the total amount of the metallic elements are in ranges of 3 to 9 atomic %, 0.5 to 4.0 atomic %, 86 to 93 atomic %, and 0.5 to 3.0 atomic %, respectively.

European Patent No. 0940823 B1 (corresponding to Japanese Patent No. 3,181,559 and U.S. Pat. No. 6,402,980) discloses a sintered magnet comprising a primary phase of a hexagonal ferrite containing Ca, R, Fe, and M, which is represented by $Ca_{1-x}R_x(Fe_{12-y}M_y)_zO_{19}$, wherein M is at least one element selected from the group consisting of Co, Ni, and Zn, with Co being essentially contained in M (the proportion of cobalt in M is at least 10 atomic %); R is at least one element selected from rare earth elements including La, Y, and Bi, with La being essentially contained in R; and the proportions of Ca, R, Fe and M elements with respect to the total amount of the metallic elements are in ranges of 1 to 13 atomic %, 0.05 to 10 atomic %, 80 to 95 atomic %, and 1.0 to 7.0 atomic %, respectively.

U.S. Pat. No. 6,139,766 discloses a sintered ferrite magnet having the composition of $A_{1-x}R_x(Fe_{12-y}M_y)_zO_{19}$, wherein A is at least one element selected from the group consisting of Sr, Ba, and Pb, with Sr being essentially contained in A; R is at least one element selected from rare earth elements including La and Y, with La being essentially contained in R; M is cobalt or a mixture of cobalt and zinc; and x, y and z satisfy the conditions of $0.04 \leq x \leq 0.9$, $0.04 \leq y \leq 0.5$, and $0.7 \leq z \leq 1.2$, respectively.

Korean Patent No. 10-0839206 discloses a magnetic material comprising a primary phase of a hexagonal ferrite, the primary phase being represented by $La_xCa_m\alpha_{1-x-y}(Fe_{12-y}Co_y)_z$ with $\alpha$ being Ba, Sr or a mixture thereof, wherein the constituent ratios of the metal elements constituting the primary phase satisfy the following conditions: in the region bound by the points, A:(0.53, 0.27), B:(0.64, 0.27), C:(0.64, 0.35), D:(0.53, 0.45), E:(0.47, 0.45), and F:(0.47, 0.32) in the (x, m) coordinates, $1.3 \leq x/yz \leq 1.8$, $9.5 \leq 12z \leq 11.0$, and $(1-x-m)/(1-x) \leq 0.42$.

Such conventional ferrite magnetic materials, however, still show unsatisfactory magnetic characteristics. Accordingly, efforts are continuing to develop magnetic materials having improved magnetic properties to meet the recent requirements, i.e., high performance, high efficiency, miniaturization, and weight reduction of motors for automobiles and motors for electric equipments as well as for home appliances.

SUMMARY OF INVENTION

Accordingly, it is a primary object of the present invention to provide a ferrite magnetic material which can provide improved magnetic properties in terms of the residual magnetic flux density (Br), intrinsic coercive force (iHc), squareness (Hk/iHc), and maximum energy product (B.Hmax), and a segment-type permanent magnet derived therefrom.

In accordance with one aspect of the present invention, there is provided a ferrite magnetic material comprising a primary phase of a magnetoplumbite-type hexagonal ferrite, the primary phase having a composition represented by formula (I):

$$Ca_{(1-x-y-z)}Sr_xBa_yA_zFe_{(2n-m1-m2)}M_{m1}M'_{m2}O_{19} \qquad (I)$$

wherein,
A is at least one element selected from rare earth elements including La, Nd, Pr and Sm, and Bi, with La being essentially contained in A;
M is at least one element selected from the group consisting of Co, Mn, Ni, and Zn, with Co being essentially contained in M;
M' is Cr, or a mixture of Cr and Al;
$0.02 \leq x \leq 0.3$;
$0.01 \leq y \leq 0.09$;
$0.1 \leq z \leq 0.5$;
$0.1 \leq m1 \leq 0.6$;
$0.01 < m2 \leq 0.07$; and
$9.0 \leq 2n \leq 11.0$.

In accordance with another aspect of the present invention, there is provided a sintered ferrite magnet obtained by sintering the ferrite magnetic material; a segment-type permanent magnet derived from the ferrite magnetic material; and a product comprising the segment-type permanent magnet.

BRIEF DESCRIPTION OF DRAWINGS

The above and other objects and features of the present invention will become apparent from the following description of the invention taken in conjunction with the following accompanying drawings, which respectively show.

BEST MODE FOR CARRYING OUT THE INVENTION

Figure 1:
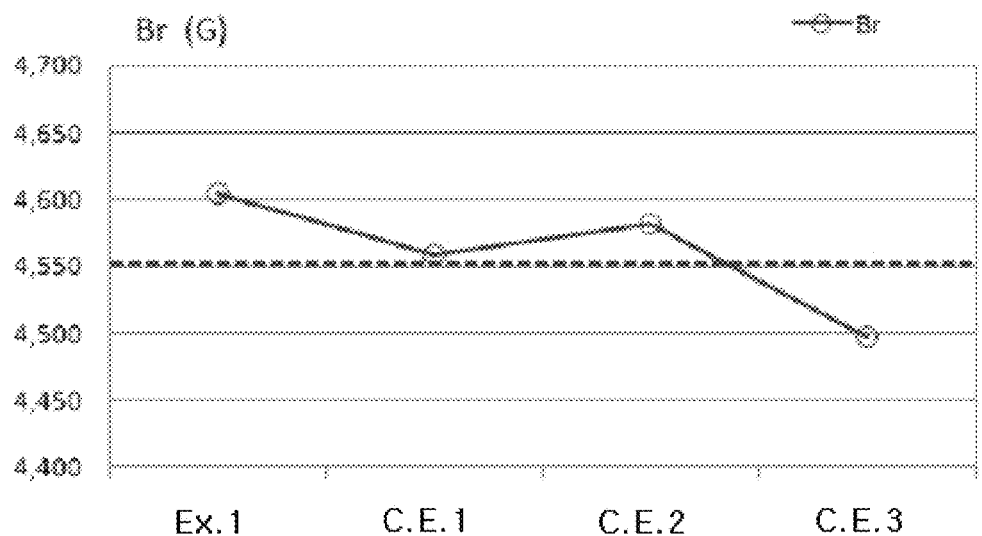
FIGS. 1 to 4: the magnetic properties, Br(G), iHc(Oe), Hk/iHc (%) and SFC (synthetic evaluation index, {Br+(⅓)iHc}×(Hk/iHc)) of the respective sintered magnets (sintering temperature 1190° C.) prepared in Example 1, and Comparative Examples 1 to 3, respectively.
Figure 2:
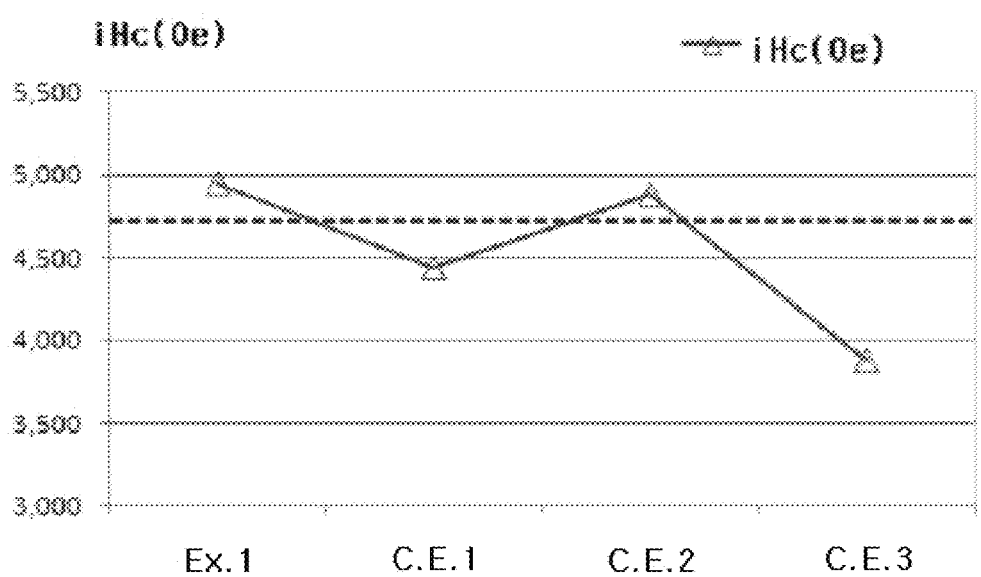
Figure 3:
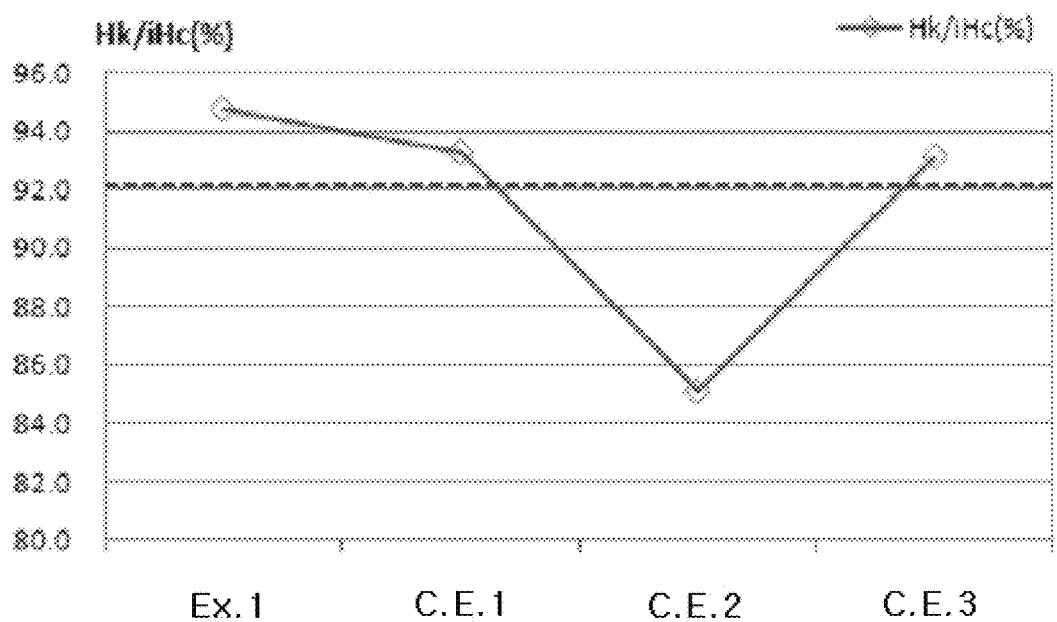
Figure 4:
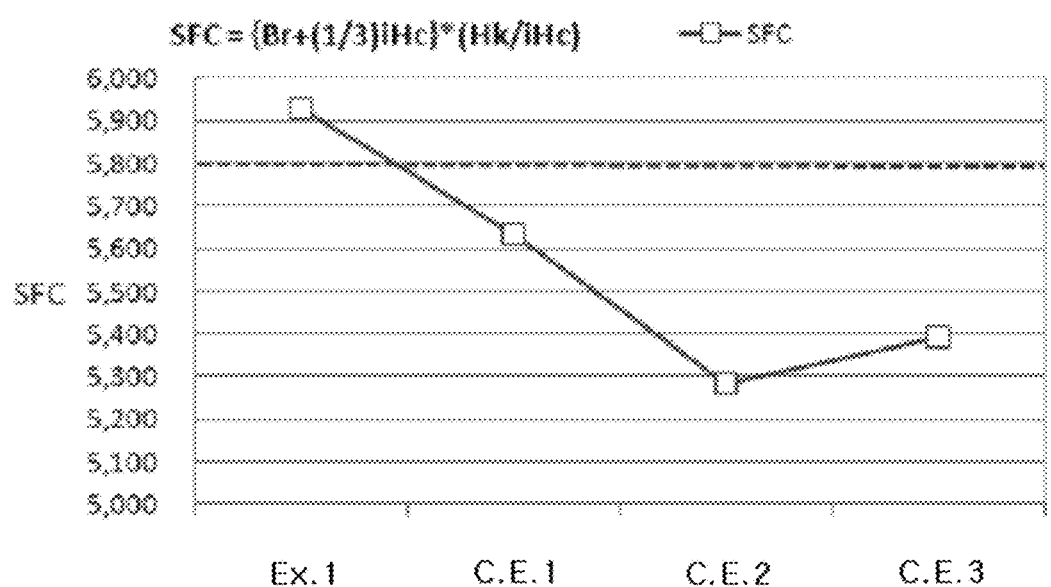
Figure 5:
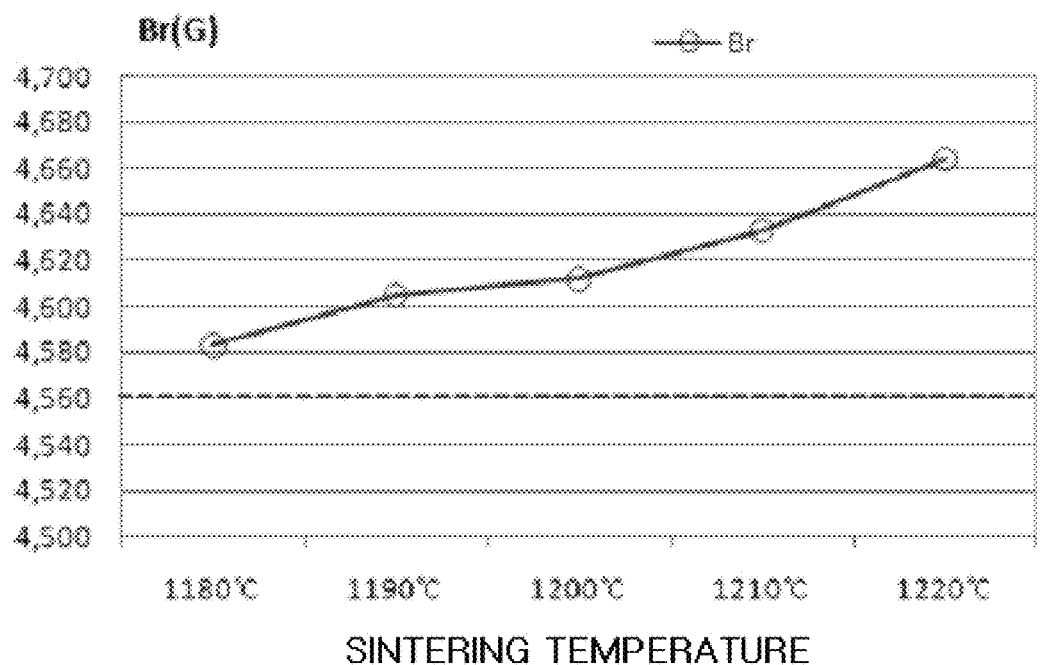
FIGS. 5 to 8: variations in the magnetic properties, Br(G), iHc(Oe), Hk/iHc (%) and SFC, as function of the sintering temperature of the sintered magnet prepared in Example 1, respectively.
Figure 6:
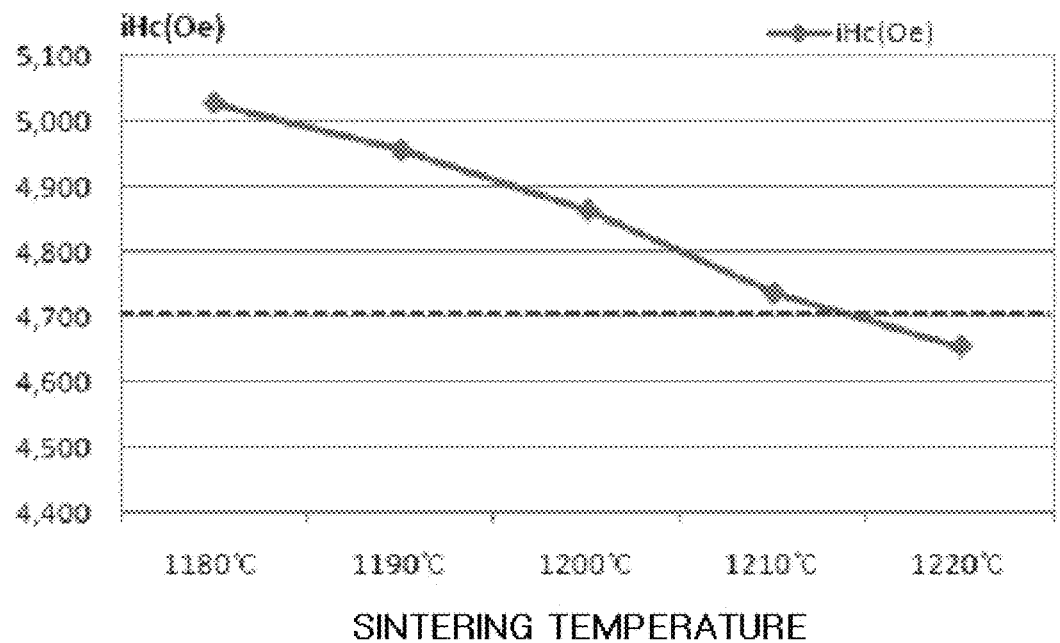
Figure 7:
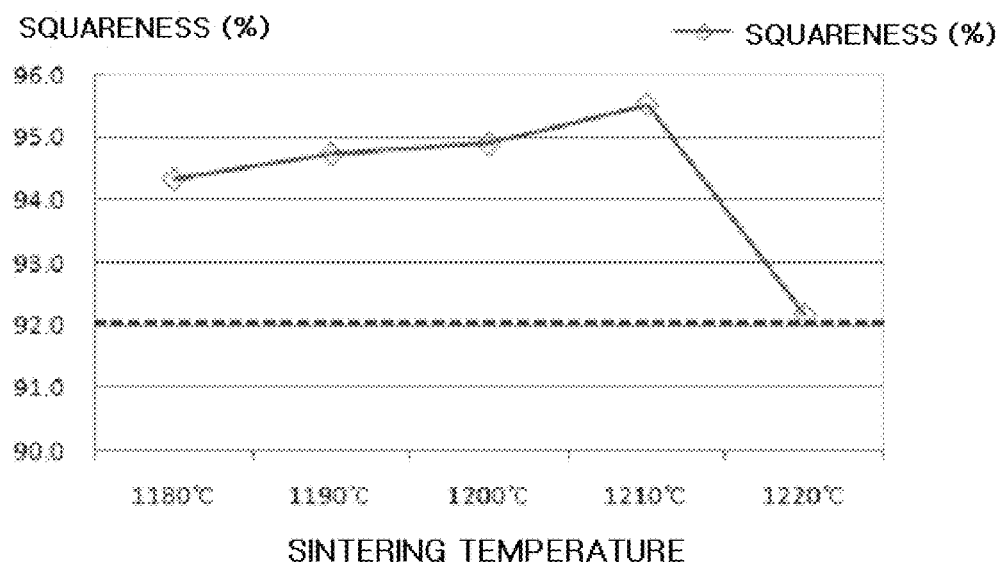
Figure 8:
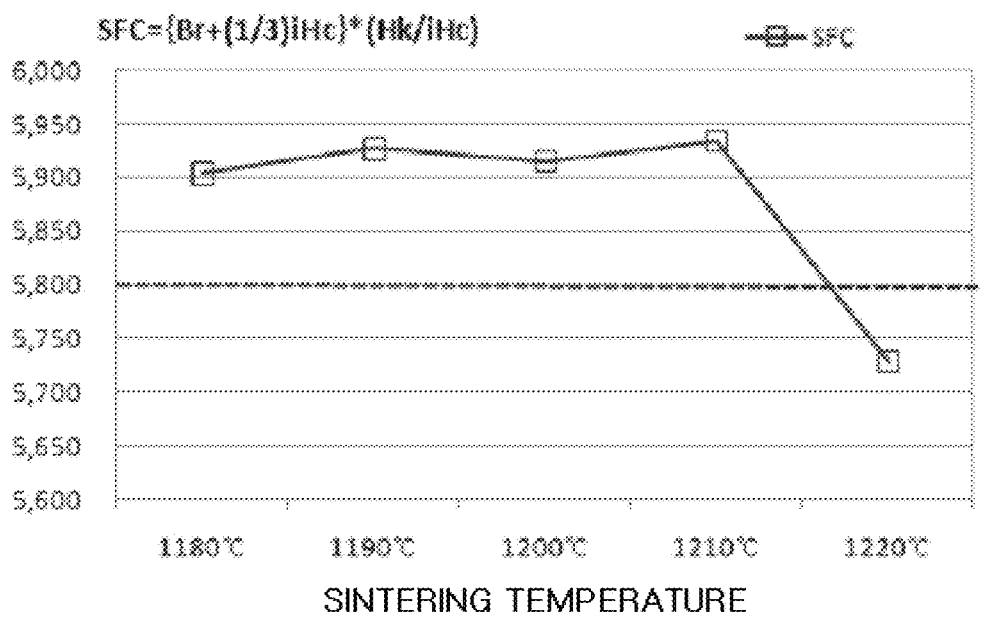

The inventive ferrite magnetic material (calcined material) is characterized by comprising a primary phase of a magnetoplumbite-type hexagonal ferrite, wherein elements constituting the primary phase have a composition represented by formula (I).

Generally, when the content of Fe, the basic element of the oxide ferrite magnetic material, becomes larger, undesirable non-magnetic phases such as $\alpha$-$Fe_2O_3$ are generated, lowering the magnetic properties. In contrast, when the content of Fe becomes smaller, the A site corresponding to the site of Fe ion having a magnetic moment becomes excessive, which leads to an increase of undesirable non-magnetic particle components, thereby significantly decreasing the magnetic properties. The magnetic properties of sintered M-type ferrite oxide magnets are based on the magnetic moment of Fe ions, which have the magnetic structure of a ferri-magnetic material arranged in the antiparallel direction. In order to enhance the magnetic properties such as saturation magnetization and a magnetic anisotropic coefficient, such Fe ions in the sites having the magnetic moment oriented in the antiparallel direction may be substituted with other elements having a smaller magnetic moment or non-magnetism; the Fe ions in the sites corresponding to the magnetic moment oriented in the parallel direction may be substituted with other elements having a larger magnetic moment; and Fe ions may be substituted with other elements having a larger crystal lattice and stronger interaction.

With respect to the composition of constituent elements of the inventive ferrite magnetic material, the value corresponding to the content of A, z is in the range of 0.1 and 0.5, preferably of 0.35 and 0.5. When the content of A is low, i.e. less than 0.1, sufficient substitution of A to enhance the magnetic properties becomes difficult; whereas when the content of A is high, i.e. more than 0.5, the amount of unreacted A oxide increases, which also results in poor magnetic properties.

M such as Co substitutes a part of Fe, acting to enhance the saturation magnetization and the crystal magnetic anisotropic coefficient of the M-type oxide ferrite magnetic material. The value of the content of M, m1 is in the range of 0.1 and 0.6, preferably of 0.2 and 0.4. When the content of M is less than 0.1, its substitution rate with Fe decreases, which makes it difficult to enhance the magnetic properties. When the content of M is more than 0.6, the ion valence with the A site element becomes disrupted, which causes the formation of undesirable foreign phases, resulting in sharp degradation of the magnetic properties.

M' such as Cr substitutes a part of Fe, which inhibits particle growth and increases the critical particle radius, leading to an increase in the magnetic anisotropic coefficient, and ultimately, iHc of the M-type oxide ferrite magnetic material.

Preferably, the values of x, y, z, m1 and m2 satisfy the conditions of $0.1 \leq x+y < 0.3$, $0.03 \leq y+m2 \leq 0.16$, $0.09 \leq y/(x+y) \leq 0.5$, $0.3 \leq (x+y)/(m1+m2) \leq 0.8$, and $1.2 \leq (1-z)/(m1+m2) \leq 2.0$, wherein the formula $(1-z)/(m1+m2)$ represents the atomic content ratio of $(Sr+Ba+Ca)/(M+M')$ and it may more preferably fall within the range of 1.4 and 1.6.

In formula (I), the atomic content ratio $(Fe+M+M')/(Ca+A+Sr+Ba)$ corresponds to 2n.

Hereinafter, exemplary preparation methods of the ferrite magnetic material and sintered magnet as an embodiment of the invention are explained in details.

<Mixing Process>

First, starting materials are weighed according to the weight percentage values calculated from a desirable composition, and they are generally wet mixed using a wet-type ball mill or a wet-type attritor for 1 to 24 hours to achieve uniform mixing.

$SrCO_3$, $BaCO_3$, $CaCO_3$, $La_2O_3$, $Fe_2O_3$, $Cr_2O_3$, $Co_3O_4$, $Pr_6O_{11}$, $Nd_2O_3$, $Sm_2O_3$, etc. may be used as the starting materials, whose preferable mean particle diameter may fall within the range of 0.2 and 1.0 μm.

If necessary, $SiO_2$, $H_3BO_3$, etc. may be further added in the mixing process so as to promote the ferrite forming reaction as well as uniform growth of particles during the subsequent calcination process.

<Calcination Process>

During the calcination process, the mixture of the starting materials undergoes a solid phase ferrite reaction to form a calcined material having a magnetoplumbite-type crystal structure. The calcination may be generally performed in an oxidizing atmosphere, e.g. air, at a temperature of 1080° C. to 1350° C. preferably for a period of 1 to 5 hours. The particle size of the calcined material is preferably in the range of 0.3 μm and 2 μm.

<Coarse Pulverization Process>

The resulting calcined material is of a clinker or a granule form, and hence need to be coarse pulverized. The coarse pulverization may be conducted using a dry vibratory mill or a dry ball mill, preferably a dry vibratory mill. The average particle size of the coarse powder after the coarse pulverization is preferably 2 μm~4 μm.

<Heat-Treatment Process>

The resulting coarse powder possesses defects such as inconsistency, distortion, and crack due to the physical stress applied during the previous pulverization process. Such defects can be removed by heat-treating the coarse powder at a temperature ranging from 900° C. to 1000° C.

<Fine Pulverization Process>

When the powder with a mean particle diameter of 1.0 μm or more is subjected to a sintering process, the proportion of coarse crystal grains becomes high due to particle growth, resulting in drastic decline of iHc. Therefore, the heat-treated powder is subjected to fine pulverization to obtain a fine powder having a mean particle diameter ranging from 0.3 μm to 0.8 μm. The fine pulverization can be carried out using a wet-type ball mill or a wet-type attritor. In case of using a wet-type ball mill, the pulverization time may be controlled within 5~40 hours, and in case of using a wet-type attritor, within 2~20 hours, depending on the predetermined desirable mean particle diameter.

In order to control the growth of particles as well as its diameter in a subsequent sintering process, an additive such as $SiO_2$, CaO or a mixture thereof may be added during the fine pulverization process. Also, $La_2O_3$, SrO, CaO, $Cr_2O_3$, $Al_2O_3$, CoO or a mixture thereof can be added to facilitate the substitution effects and to control the particle growth in the subsequent sintering process. When the amount of additives employed is too small or too large, undesirable effects occur. Thus, each of the additives may be used in an amount ranging from 0.1 to 0.6 parts by weight based on 100 parts by weight of the pulverized powder.

A dispersant may be further added during the fine pulverization process so as to enhance the alignment effects and to improve the liquidity of the slurry by lowering its viscosity, in the subsequent pressing process conducted in a magnetic field. Either aqueous or non-aqueous dispersant may be used, but considering the environmental aspect, the use of an aqueous dispersant is preferred. Suitable for use as the aqueous dispersant are organic compounds containing hydroxyl and carboxyl groups, sorbitol, calcium gluconate, and the like. The dispersant may be preferably used in an amount ranging from 0.05 to 1.0 part by weight based on 100 parts by weight of the coarse powder.

<Pressing Process>

A pressing process may be performed by a wet-type or dry-type method, wherein each method may be deposited in either isotropic or anisotropic arrangement. In order to attain high magnetic properties, a wet anisotropic pressing is preferred. In this process, the slurry after the fine pulverization is pressed under pressure in an applied magnetic field and then green body for an anisotropic sintered magnet is thus obtained.

In one embodiment of the wet anisotropic pressing, the slurry after the fine pulverization is subjected to dehydration and concentration, and then to pressing under 300 kgf/cm²~500 kgf/cm² pressure in a magnetic field of 10~20 kOe at a fixed concentration. The dehydration and concentration can be carried out by using a centrifugal separator or filter press.

Preferably, for the purpose of preventing the generation of cracks, prior to a subsequent sintering process, the green body thus formed which contains residual water in an amount ranging from 10 to 15% may be allowed to be dried. If the green body having residual water goes through a sintering process, cracks may occur during the dehydration process when the temperature rises. Thus, it is preferred to dry the green body at room temperature or at a low temperature, i.e. 50° C.~100° C. in the atmosphere.

<Sintering Process>

A sintered ferrite magnet is obtained by continuously drying and sintering the resulting green body in an oxidizing atmosphere. For elimination of residual water and dispersants remaining in the green body, dehydration and degreasing is conducted at 50° C.~300° C.

Magnetic properties of the sintered ferrite magnet can be optimized by regulating sintering conditions, e.g. a sintering time, a heating rate, a maximum temperature, a staying time at a predetermined temperature, etc. In other words, regulation of the sintering conditions (sintering time, heating rate, maximum temperature, staying time) can affect concentrations of substitution elements, grain growth, a particle size, a density of the sintered magnet, thereby determining magnetic properties of the sintered ferrite magnet, i.e. Br, bHc, iHc, B.Hmax, squareness, etc.

In a preferred embodiment, the sintering may be performed by way of treating the ferrite substrate in air at a temperature ranging from 25° C. to 500° C. for 1 hour, from 500° C. to 1000° C. for 5 hours, from 1000° C. to $T_{max}$ (1180° C. to 1210° C.) for 3 hours, at $T_{max}$ (1180° C. to 1210° C.) for 1~2 hours, from $T_{max}$ (1180° C. to 1210° C.) to 1000° C. for 2 hours, and from 1000° C. to room temperature for 5 hours.

The magnetoplumbite-type sintered ferrite magnet according to the present invention features excellent magnetic properties including: a residual magnetic flux density (Br) of 4550 G or greater; an intrinsic coercive force (iHc) of 4700 Oe or greater; a squareness (Hk/iHc) of 92% or greater; and a synthetic evaluation index (SFC={Br+(⅓) iHc}×(Hk/iHc)) of 5800 or greater.

Also, the segment-type permanent magnet derived from the inventive magnetoplumbite-type ferrite magnetic material and preformed to have an outer radius of 33.4 R, a width of 21.9 W, a thickness of 6.16 T, and a length of 45 L exhibits good magnetic properties of ΦR≥0.330 (mVs), ΦRG≥0.320 (mVs), and HGF(80)≥310 (kA/m) when tested with a magnetic property measurement system, Robograph 2(ECKEL). As shown in the result, the inventive sintered ferrite magnet can satisfy the required characteristics such as high performance, high efficiency, miniaturization and weight reduction, and therefore, it can be used in the manufacture of small type motors for automobiles, motors for electric equipments as well as for home appliances, and other devices.

Hereinafter, the present invention is described more specifically by the following examples, but these are provided only for illustration purposes, and the present invention is not limited thereto.

Example 1

Strontium carbonate ($SrCO_3$), barium carbonate ($BaCO_3$), calcium carbonate ($CaCO_3$), lanthanum oxide ($La_2O_3$), lanthanum hydroxide ($La(OH)_3$), iron oxide ($Fe_2O_3$), chromium oxide ($Cr_2O_3$), and cobalt oxide (CoO) were used as starting materials. These raw materials were weighed according to the composition shown in Table 2, and blended so as to obtain the sintered ferrite magnet of $Ca_{(1-x-y-z)}Sr_xBa_yLa_zFe_{(2n-m1-m2)}Co_{m1}Cr_{m2}O_{19}$ as shown in Table 3. Prior to the blending, all of the raw materials were previously pulverized and disintegrated to have a particle diameter of 0.6~1.0 μm.

The mixture was diluted to have a concentration of 40%, and wet and circulating stirred for 20 hours. Then, the resulting mixture was dried at 200° C. for 24 hours and calcined at 1120° C. for 2 hours, in sequence. The resulting calcined material was pulverized using a dry vibratory mill to obtain a coarse powder with an average diameter of 3 μm. The coarse powder was heat-treated at 1000° C. for 2 hours and put into a wet-type attritor with water to give a concentration of 43%. $La_2O_3$ (0.5 parts by weight), CaO (0.45 parts by weight), $SiO_2$ (0.4 parts by weight), and dispersant calcium gluconate (0.3 parts by weight) were added thereto based on 100 parts by weight of the coarse powder, and comminuted for 8 hours to give a slurry having an average particle diameter of 0.65 μm.

The slurry thus prepared was placed into a cylindrical shape of a molding having a diameter of 40 mm and a height of 10 mm, and it was subjected to pressing in a magnetic field of 15 kOe with a compacting pressure of 0.4 Ton/cm² to form a green body.

The green body thus formed was dried at 200° C. for 10 hours, sintered in air according to the condition specified in Table 1, and then the sintered product was processed to have a diameter of 35 mm and a thickness of 10 mm. The maximum temperature at sintering ($T_{max}$) was set-up as 1180, 1190, 1200, 1210 and 1220° C., respectively.

TABLE 1

| | Temp. | | | | | Oxygen partial pressure |
|---|---|---|---|---|---|---|
| | 25~500° C. | 500~1000° C. | 1000° C.~$T_{max}$ | $T_{max}$ | $T_{max}$~1000° C. | 1000° C.~room temp. | |
| Time | 1 hr | 5 hrs | 3 hrs | 2 hrs | 2 hrs | 5 hrs | 0.1 atm |

Magnetic characteristics of the prepared M-type sintered ferrite magnet were measured by using a B—H curve tracer and the results thereof are shown in Tables 4a to 4e according to the value $T_{max}$. The composition of the sintered magnet is recorded in Table 3.

Comparative Examples 1 to 3

The procedures of the above Example 1 were repeated to prepare the M-type sintered ferrite magnets, except that starting materials were weighed according to the composition described in Table 2 without employing barium carbonate ($BaCO_3$) and chromium oxide ($Cr_2O_3$) so as to meet the final composition as specified in Table 3.

The compositions of the sintered magnets and the results of magnetic characteristics according to the value $T_{max}$ are shown in Table 3 and Tables 4a to 4e, respectively.

The results of the magnetic properties, Br, iHc, Hk/iHc and SFC of the respective sintered magnets (sintering temperature 1190° C.) prepared in Example 1, and Comparative Examples 1 to 3 are shown in FIGS. 1 to 4, respectively. Also, variations in the magnetic properties, Br, iHc, Hk/iHc and SFC, as function of the sintering temperature of the sintered magnet prepared in Example 1 are shown in FIGS. 5 to 8, respectively.

TABLE 2

$Ca_{(1-x-y-z)}Sr_xR_yA_zFe_{(2n-m1-m2)}M_{m1}M'_{m2}O_{19}$ (mix composition)

| | n | Sr (x) | Ba (y) | La (z) | Ca (1 − x − y − z) | Fe (2n − m1 − m2) | Co (m1) | Cr (m2) | Fe + Co + Cr (2n) | (Sr + Ba + Ca)/ (Co + Cr) (1 − z)/(m1 + m2) |
|---|---|---|---|---|---|---|---|---|---|---|
| Ex. 1 | 5.4 | 0.10 | 0.05 | 0.45 | 0.40 | 10.46 | 0.31 | 0.04 | 10.80 | 1.571 |
| C. E. 1 | 5.7 | 0.10 | — | 0.50 | 0.40 | 11.10 | 0.30 | — | 11.40 | 1.667 |
| C. E. 2 | 5.7 | 0.10 | — | 0.40 | 0.50 | 11.10 | 0.30 | — | 11.40 | 2.00 |
| C. E. 3 | 5.7 | 0.10 | — | 0.55 | 0.35 | 11.10 | 0.30 | — | 11.40 | 1.50 |

TABLE 3

$Ca_{(1-x-y-z)}Sr_xR_yA_zFe_{(2n-m1-m2)}M_{m1}M'_{m2}O_{19}$ (sintered magnet composition)

| | n | Sr (x) | Ba (y) | La (z) | Ca (1 − x − y − z) | Fe (2n − m1 − m2) | Co (m1) | Cr (m2) | Fe + Co + Cr (2n) | (Sr + Ba + Ca)/ (Co + Cr) (1 − z)/ (m1 + m2) | (Ba + Sr)/ (Co + Cr) (x + y)/ (m1 + m2) |
|---|---|---|---|---|---|---|---|---|---|---|---|
| Ex. 1 | 4.89 | 0.091 | 0.045 | 0.408 | 0.457 | 9.465 | 0.281 | 0.036 | 9.78 | 1.868 | 0.429 |
| C. E. 1 | 5.10 | 0.127 | — | 0.475 | 0.398 | 9.923 | 0.268 | — | 10.191 | 1.959 | 0.474 |
| C. E. 2 | 5.10 | 0.126 | — | 0.386 | 0.488 | 9.934 | 0.268 | — | 10.202 | 2.291 | 0.470 |
| C. E. 3 | 5.09 | 0.127 | — | 0.520 | 0.354 | 9.918 | 0.268 | — | 10.186 | 1.795 | 0.474 |

TABLE 4a magnetic properties of sintered magnet (1180° C.)

| | Sintering temp. (° C.) | Br (G) | bHc (Oe) | iHc (Oe) | Hk (Oe) | B.Hmax (M.GOe) | Hk/iHc | (Br + 1/3iHc) * (Hk/iHc) |
|---|---|---|---|---|---|---|---|---|
| Ex. 1 | 1180 | 4583 | 4392 | 5027 | 4742 | 5.18 | 94.3 | 5904 |
| C. E. 1 | 1180 | 4546 | 4233 | 4425 | 4244 | 4.98 | 95.9 | 5775 |
| C. E. 2 | 1180 | 4572 | 4205 | 5009 | 4316 | 5.09 | 86.2 | 5378 |
| C. E. 3 | 1180 | 4504 | 3693 | 3847 | 3432 | 4.95 | 89.2 | 5162 |

TABLE 4b magnetic properties of sintered magnet (1190° C.)

| | Sintering temp. (° C.) | Br (G) | bHc (Oe) | iHc (Oe) | Hk (Oe) | B.Hmax (M.GOe) | Hk/iHc | (Br + 1/3iHc) * (Hk/iHc) |
|---|---|---|---|---|---|---|---|---|
| Ex. 1 | 1190 | 4605 | 4371 | 4955 | 4694 | 5.22 | 94.7 | 5927 |
| C. E. 1 | 1190 | 4558 | 4231 | 4442 | 4143 | 5.07 | 93.3 | 5632 |
| C. E. 2 | 1190 | 4582 | 4155 | 4885 | 4157 | 4.99 | 85.1 | 5285 |
| C. E. 3 | 1190 | 4497 | 3788 | 3880 | 3613 | 4.94 | 93.1 | 5392 |

TABLE 4c magnetic properties of sintered magnet (1200° C.)

| | Sintering temp. (° C.) | Br (G) | bHc (Oe) | iHc (Oe) | Hk (Oe) | B.Hmax (M.GOe) | Hk/iHc | (Br + 1/3iHc) * (Hk/iHc) |
|---|---|---|---|---|---|---|---|---|
| Ex. 1 | 1200 | 4612 | 4335 | 4863 | 4615 | 5.24 | 94.9 | 5915 |
| C. E. 1 | 1200 | 4561 | 4157 | 4293 | 4142 | 5.04 | 96.5 | 5781 |
| C. E. 2 | 1200 | 4599 | 3995 | 4763 | 3666 | 4.92 | 77.0 | 4762 |
| C. E. 3 | 1200 | 4473 | 3826 | 4002 | 3638 | 4.85 | 90.9 | 5279 |

TABLE 4d magnetic properties of sintered magnet (1210° C.)

| | Sintering temp. (° C.) | Br (G) | bHc (Oe) | iHc (Oe) | Hk (Oe) | B.Hmax (M.GOe) | Hk/iHc | (Br + 1/3iHc) * (Hk/iHc) |
|---|---|---|---|---|---|---|---|---|
| Ex. 1 | 1210 | 4633 | 4260 | 4736 | 4524 | 5.28 | 95.5 | 5934 |
| C. E. 1 | 1210 | 4575 | 4187 | 4376 | 4184 | 5.05 | 95.6 | 5769 |
| C. E. 2 | 1210 | 4602 | 3666 | 4779 | 2479 | 4.46 | 51.9 | 3214 |
| C. E. 3 | 1210 | 4512 | 3838 | 3933 | 3760 | 4.97 | 95.6 | 5567 |

TABLE 4e magnetic properties of sintered magnet (1220° C.)

| | Sintering temp. (° C.) | Br (G) | bHc (Oe) | iHc (Oe) | Hk (Oe) | B.Hmax (M.GOe) | Hk/iHc | (Br + 1/3iHc) * (Hk/iHc) |
|---|---|---|---|---|---|---|---|---|
| Ex. 1 | 1220 | 4664 | 4145 | 4654 | 4290 | 5.21 | 92.2 | 5729 |
| C. E. 1 | 1220 | 4587 | 4188 | 4426 | 4190 | 5.00 | 94.7 | 5739 |
| C. E. 2 | 1220 | 4634 | 3132 | 4488 | 1264 | 3.70 | 28.2 | 1726 |
| C. E. 3 | 1220 | 4523 | 3897 | 3998 | 3853 | 4.92 | 96.4 | 5643 |

As shown in Tables 4a to 4e and FIGS. 1 to 4, the sintered magnet prepared in Example 1 exhibited significantly improved magnetic properties including Br, iHc, and SFC at all of the maximum sintering temperature, as compared to those prepared in Comparative Examples 1 to 3. Particularly, FIGS. 5 to 8 showed that the sintered magnet of Example 1 sintered at the maximum temperature of 1190° C. has the SFC of 5927, which suggests that it is of an optimal condition. Also, it is confirmed that Hk/iHc at the maximum sintering temperature of 1210° C. shows the highest level of 95.5%, and SFC={Br+(⅓)iHc}×(Hk/iHc) represents values ranging from 5904 to 5934 at the maximum sintering temperature of 1180° C.~1210° C.

Meanwhile, the value of Br increases as the sintering temperature increases, whereas the value of iHc gradually decreases and rapidly drops at the maximum sintering temperature of 1220° C. It is expected that the occurrence of this phenomenon is caused by the overgrowth of particles owing to the rise of the maximum sintering temperature.

Example 2

The procedures of Example 1 were repeated to prepare the segment-type ferrite permanent magnet 33.4 R×21.9 W×6.16 T×45 L, except that a segment-type molding (33.4 R(outer radius)×21.9 W(width)×6.16 T(thickness)×45 L(length)) was employed instead of the cylindrical-type molding (diameter 40 mm×height 10 mm); the maximum sintering temperature was set-up as 1180° C.; and the resulting sintered product was processed by using a segment-type grind machine.

Magnetic properties of the segment-type permanent magnet thus prepared was measured using a magnetic property measurement system, Robograph 2(ECKEL), and the results of its magnetic properties of ΦR, ΦRG and HGF(80) are shown in Table 5, wherein the "ΦRG" value was at least $0.94 \times \Phi R_{min}$ (measurement system was set as $\Phi R_{min} \leq \Phi R \leq \Phi R_{max}$), which was used for evaluating the squareness of the hysteresis loop. Also, "HGF(80)" represents a value where 80% of ΦR intersects $2^{nd}$ quadrant demagnetization curve, which was used for evaluating the squareness and iHc of the hysteresis loop.

TABLE 5

| Sample No. | Size (mm) | | | | Unit weight (gr) | Magnetic properties | | |
|---|---|---|---|---|---|---|---|---|
| | Outer radius | Width | Length | Thickness | | $\Phi R$ (mVs) | $\Phi RG$ (mVs) | HGF (80) (kA/m) |
| 2-1 | 33.36 | 21.90 | 44.85 | 6.17 | 29.56 | 0.334 | 0.320 | 342 |
| 2-2 | 33.37 | 21.89 | 45.13 | 6.16 | 29.74 | 0.335 | 0.323 | 344 |
| 2-3 | 33.37 | 21.88 | 44.95 | 6.16 | 29.62 | 0.333 | 0.322 | 342 |
| 2-4 | 33.38 | 21.87 | 45.04 | 6.16 | 29.69 | 0.335 | 0.320 | 339 |
| 2-5 | 33.37 | 21.87 | 45.03 | 6.17 | 29.71 | 0.335 | 0.322 | 340 |
| 2-6 | 33.38 | 21.86 | 44.98 | 6.17 | 29.59 | 0.334 | 0.321 | 343 |
| 2-7 | 33.36 | 21.87 | 45.14 | 6.15 | 29.62 | 0.333 | 0.321 | 343 |
| 2-8 | 33.37 | 21.86 | 44.92 | 6.17 | 29.54 | 0.333 | 0.321 | 342 |
| 2-9 | 33.36 | 21.87 | 44.93 | 6.17 | 29.57 | 0.334 | 0.321 | 341 |
| 2-10 | 33.38 | 21.88 | 45.01 | 6.16 | 29.69 | 0.333 | 0.320 | 343 |
| Average | 33.37 | 21.88 | 45.0 | 6.16 | 29.63 | 0.334 | 0.321 | 342 |

As shown in Table 5, the permanent magnet prepared in Example 2 satisfied the conditions of $\Phi R \geq 0.333$ (mVs), $\Phi RG \geq 0.320$ (mVs), and HGF(80)$\geq 339$ (kA/m).

Comparative Example 4

The procedures of Comparative Example 2 were repeated to prepare the segment-type permanent magnet 33.4 R×21.9 W×6.16 T×45 L, except for using $Sr_{(1-x-y)}Ca_xLa_yFe_{(2n-z)}Co_zO_{19}$ (n=5.85, x=0, y=0.25, z=0.2) as a composition of the calcined material.

The magnetic properties of permanent magnets thus prepared with sample sizes are shown in Table 6.

Figure 9:
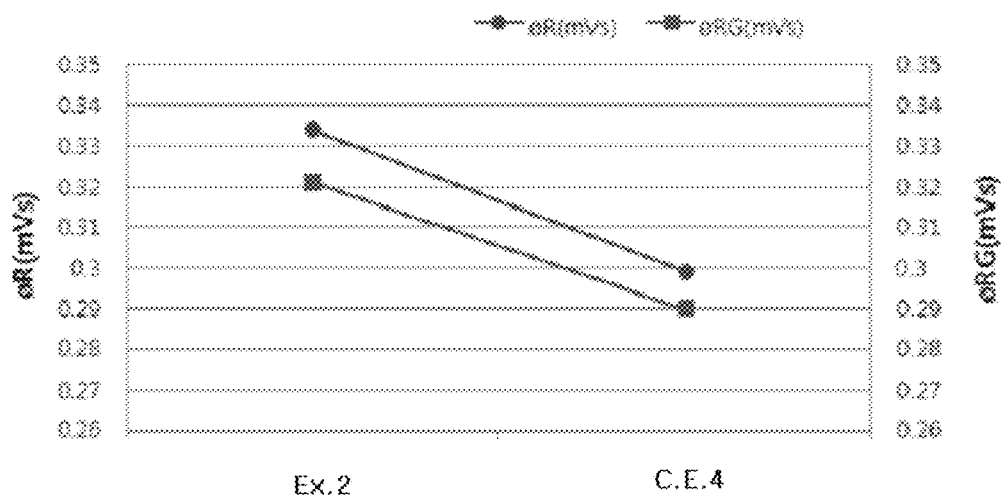
FIGS. 9 and 10: the magnetic properties, ΦR-ΦRG and HGF(80) of the segment-type permanent magnets prepared in Example 2 and Comparative Example 4, respectively.
Figure 10:
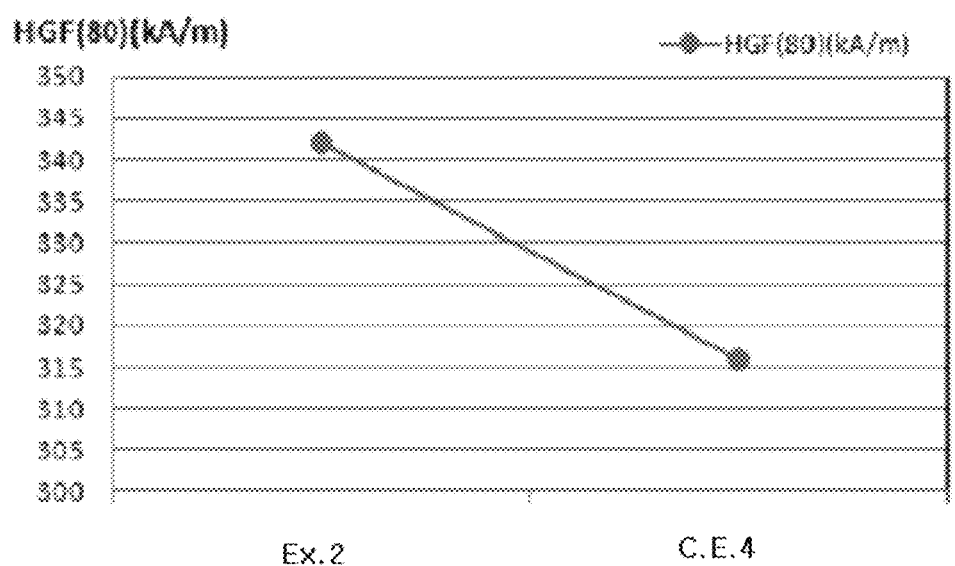
Figure 11:
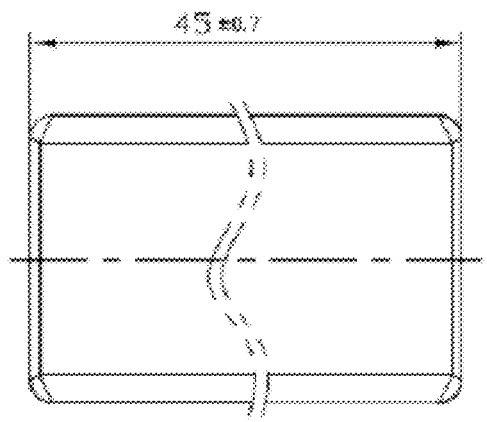
FIGS. 11 and 12: the right side/three-dimensional views and front/cross-sectional views of the molding used for the manufacture of the segment-type (33.4 R×21.9 W×6.16 T×45 L) ferrite permanent magnet in Example 2 and Comparative Example 4, respectively.
Figure 11:
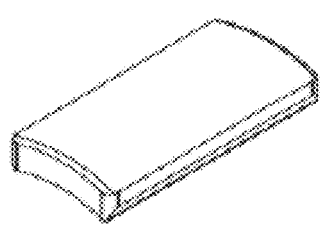
Figure 12:
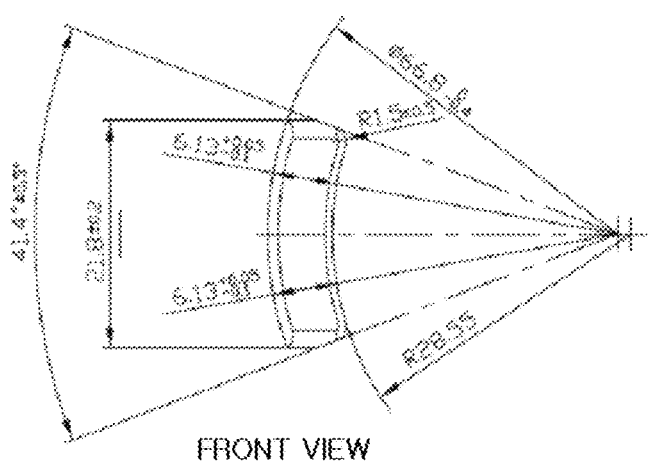
Figure 12:
Figure 13:
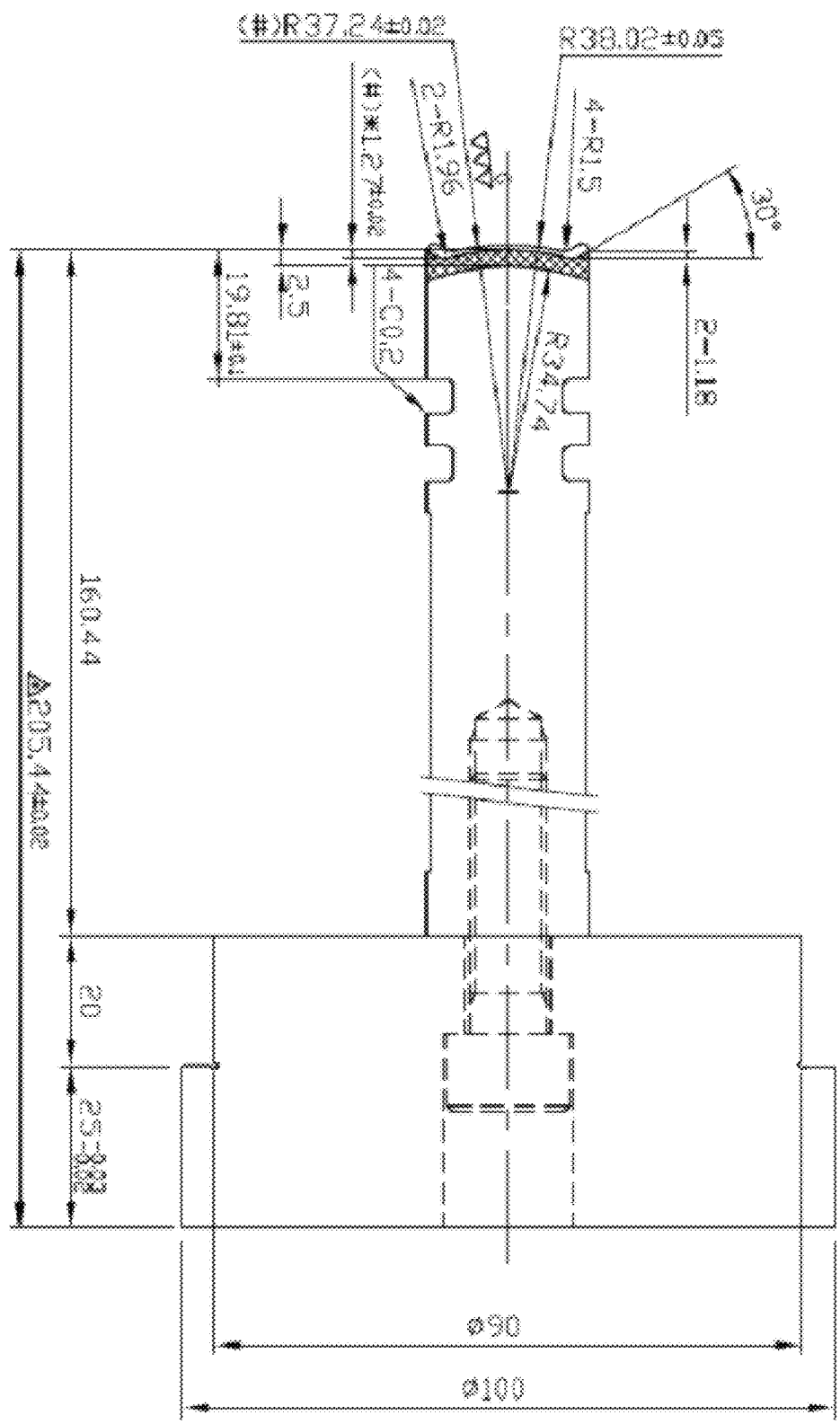
FIGS. 13 to 16: the lower punch structure, die structure, upper punch structure and assembly drawings of the molding used for the manufacture of the segment-type (33.4 R×21.9 W×6.16 T×45 L) ferrite permanent magnet in Example 2 and Comparative Example 4, respectively.
Figure 14:
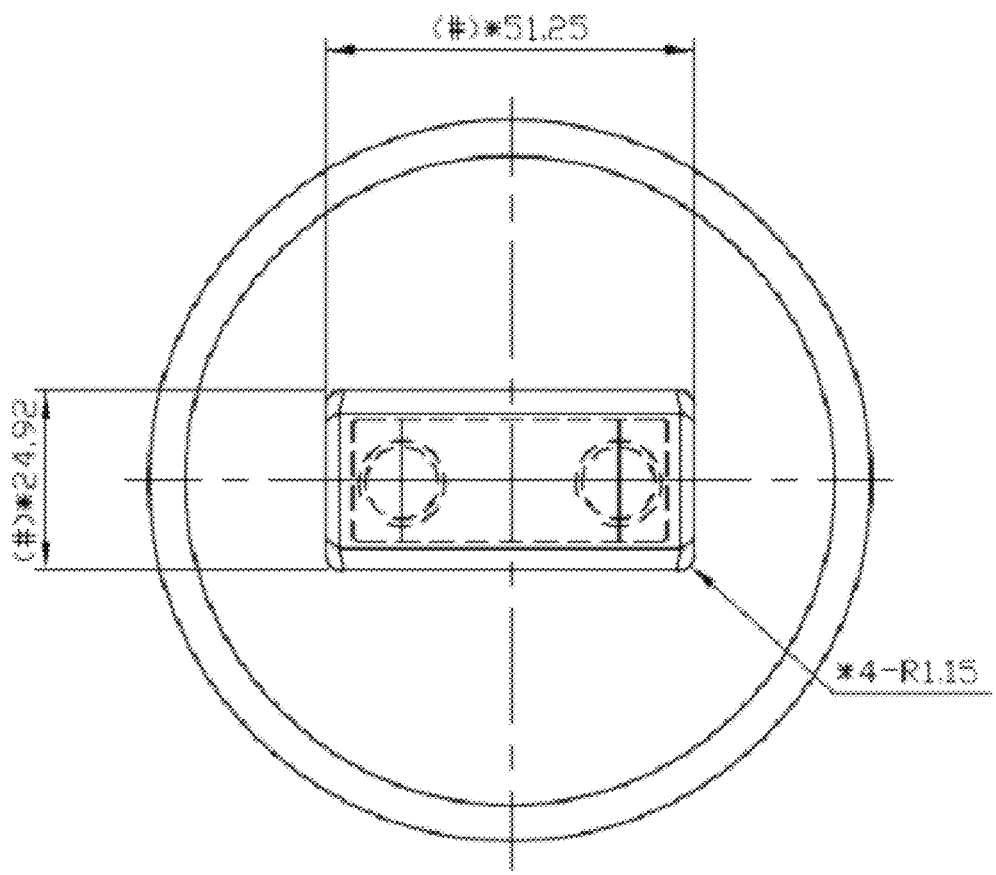
Figure 14:
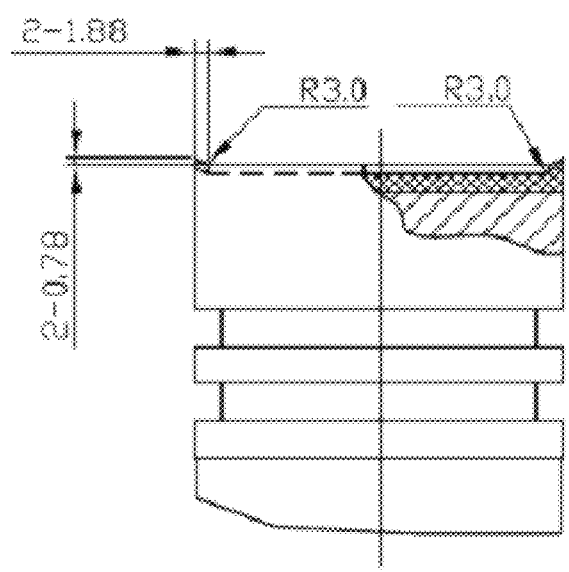
Figure 15:
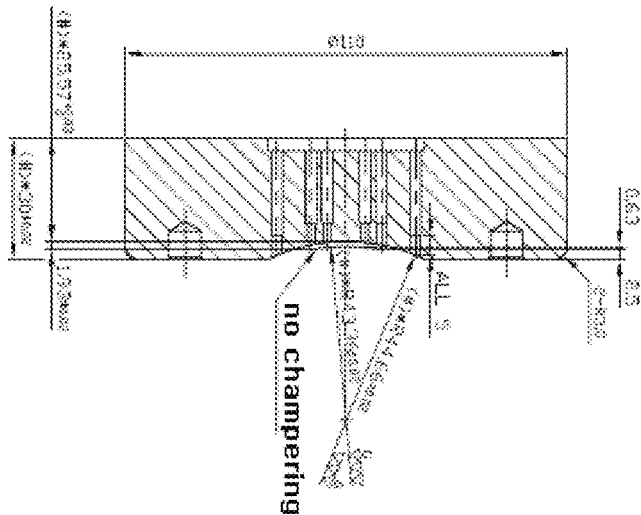
Figure 15:
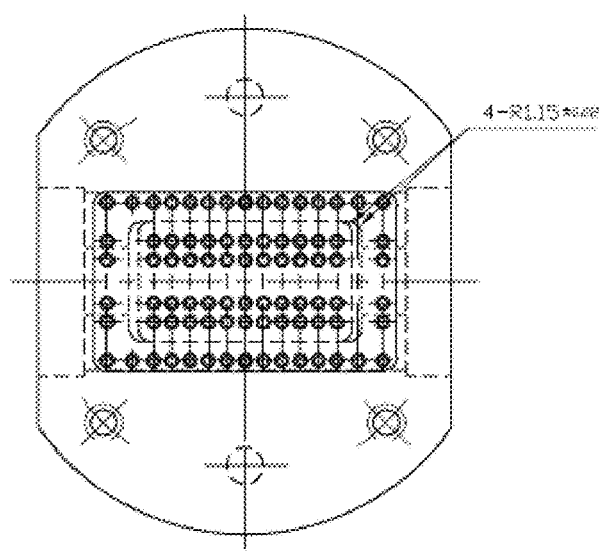
Figure 15:
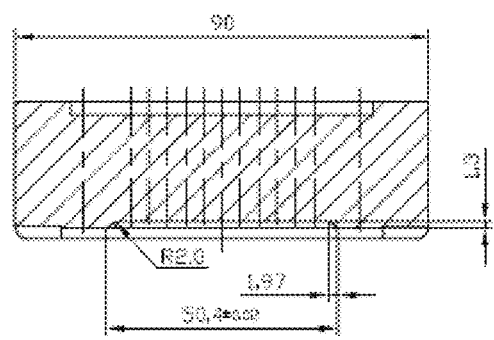
Figure 16:
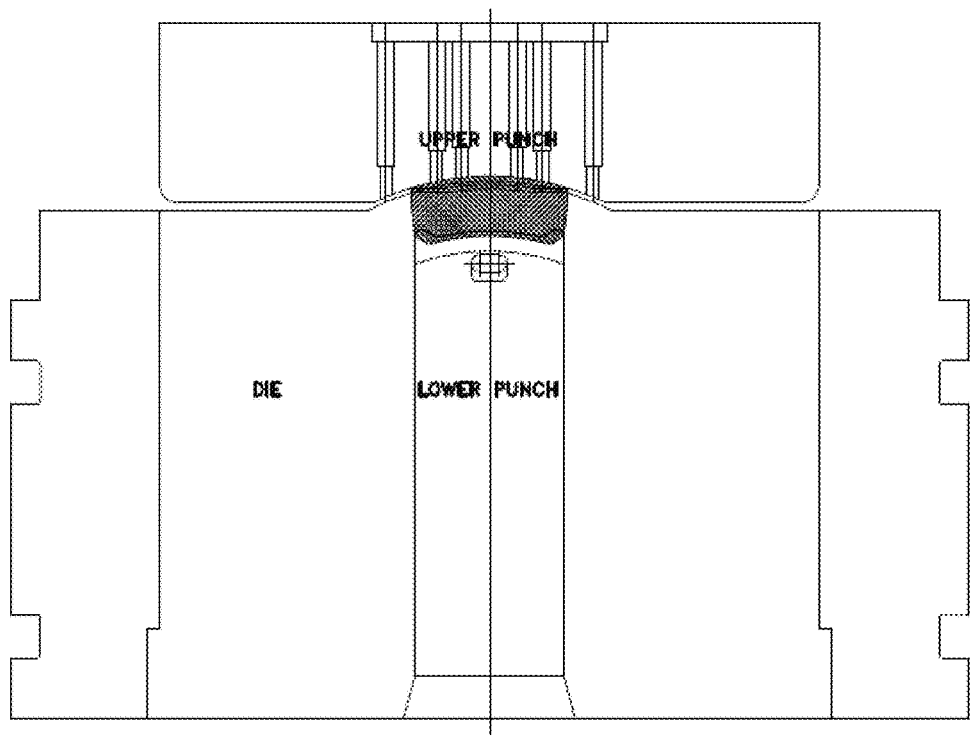

Also, the magnetic properties, $\Phi R$-$\Phi RG$ and HGF(80), of the segment-type permanent magnets prepared in Example 2 and Comparative Example 4 are shown in FIGS. 9 and 10, respectively.

TABLE 6

| Sample No. | Size (mm) | | | | Unit weight (gr) | Magnetic properties | | |
|---|---|---|---|---|---|---|---|---|
| | Outer radius | Width | Length | Thickness | | $\Phi R$ (mVs) | $\Phi RG$ (mVs) | HGF (80) (kA/m) |
| 4-1 | 33.37 | 21.90 | 44.94 | 6.18 | 28.92 | 0.298 | 0.287 | 314 |
| 4-2 | 33.38 | 21.91 | 45.31 | 6.15 | 29.08 | 0.299 | 0.289 | 315 |
| 4-3 | 33.36 | 21.90 | 45.13 | 6.17 | 29.10 | 0.301 | 0.291 | 316 |
| 4-4 | 33.37 | 21.89 | 45.10 | 6.17 | 29.11 | 0.298 | 0.288 | 317 |
| 4-5 | 33.36 | 21.90 | 45.14 | 6.17 | 29.02 | 0.299 | 0.289 | 315 |
| 4-6 | 33.37 | 21.91 | 45.19 | 6.17 | 29.26 | 0.299 | 0.290 | 316 |
| 4-7 | 33.38 | 21.90 | 45.18 | 6.17 | 29.33 | 0.301 | 0.292 | 318 |
| 4-8 | 33.36 | 21.90 | 45.16 | 6.17 | 29.25 | 0.301 | 0.292 | 315 |
| 4-9 | 33.37 | 21.89 | 45.08 | 6.14 | 28.98 | 0.297 | 0.289 | 313 |
| 4-10 | 33.38 | 21.91 | 45.15 | 6.17 | 29.11 | 0.299 | 0.289 | 317 |
| Average | 33.37 | 21.90 | 45.14 | 6.17 | 29.12 | 0.299 | 0.290 | 316 |

As shown in Tables 5-6 and FIGS. 9-10, $\Phi R$, $\Phi RG$, and HGF(80) of the permanent magnet prepared in Example 2 were 11.7%, 10.7% and 8.2% higher than its counterparts from Comparative Example 4, respectively.

Example 3 to 21 and Comparative Examples 5 to 15

The procedures of Example 1 were repeated to prepare the M-type sintered ferrite magnets, except that starting materials were weighed according to the composition described in Table 7 with employing $CaCO_3$(0.8 parts by weight) instead of CaO (0.45 parts by weight) as a fine pulverizing aid so as to meet the final composition as specified in Table 8; and the maximum sintering temperature was set-up as 1180° C.

The compositions and magnetic properties of the sintered magnets thus prepared were recorded in Tables 8 and 9, respectively.

Figure 17:
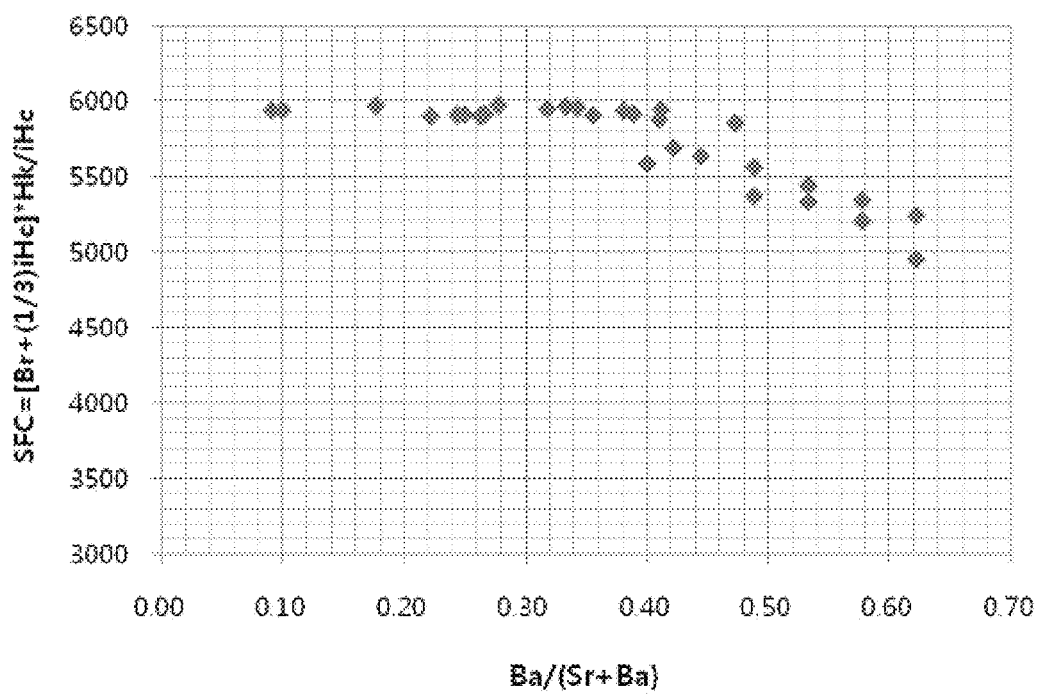
FIGS. 17 to 19: variations in SFC as function of Ba/(Sr+Ba)(i.e., the value of y/x+y), Ba+Cr (i.e., the value of y+m2) and Cr (i.e., the value of m2) of the sintered magnets prepared in Examples 3 to 21 and Comparative Examples 5 to 15, respectively.
Figure 18:
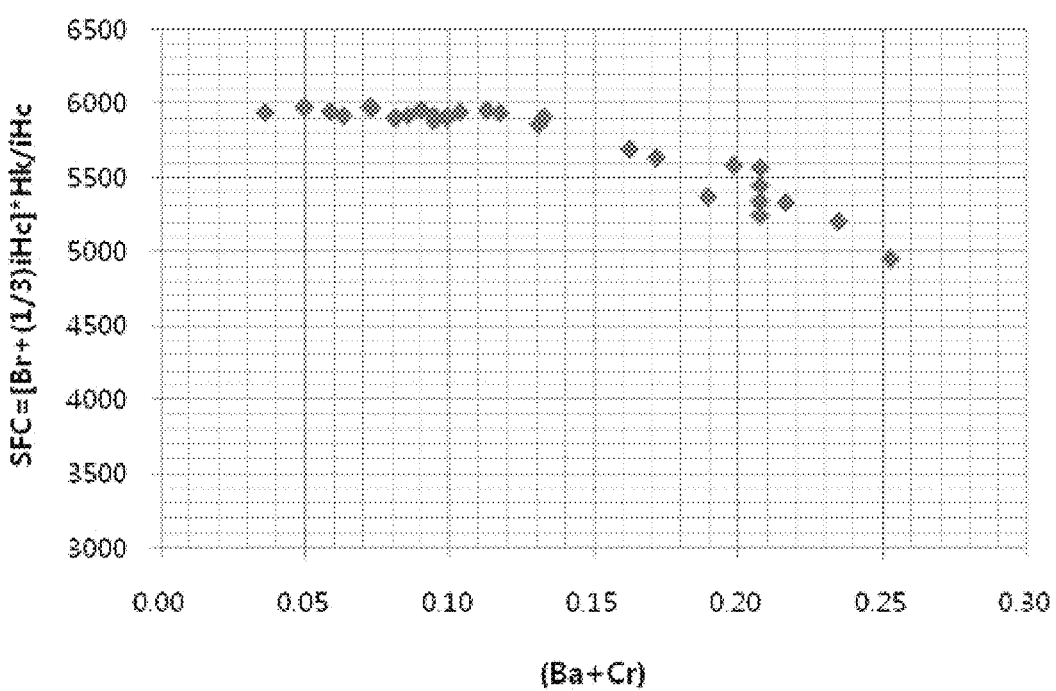
Figure 19:
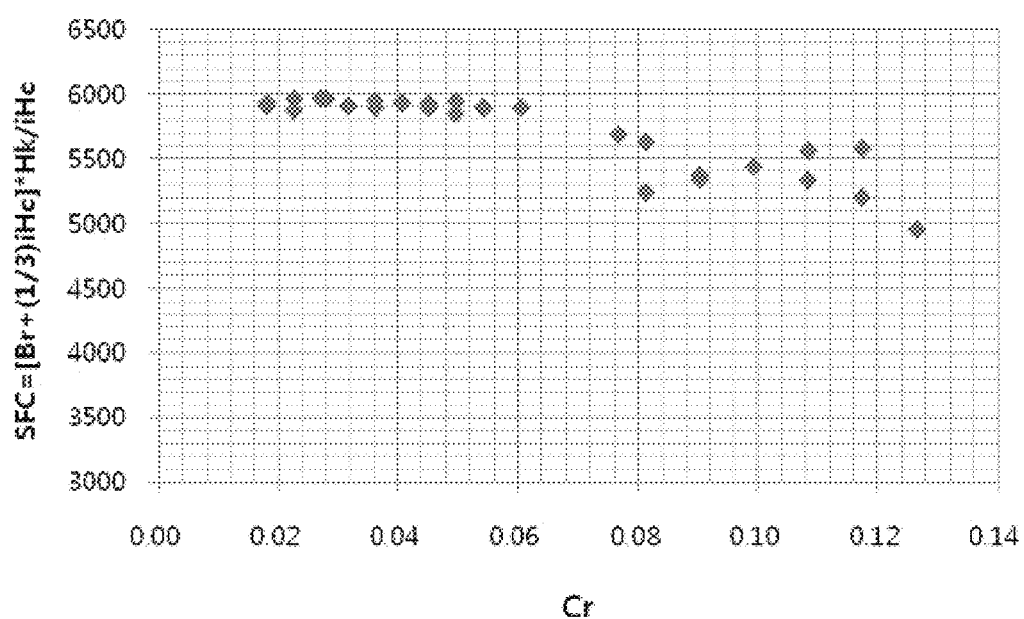

Also, variations in SFC as a function of Ba/(Sr+Ba)(i.e., the value of y/x+y), Ba+Cr, (i.e., the value of y+m2), and Cr (i.e., the value of m2) of the sintered magnets prepared in Examples 3 to 21 and Comparative Examples 5 to 15, were measured and recorded in FIGS. 17 to 19, respectively.

TABLE 7

$Ca_{(1-x-y-z)}Sr_xR_yA_zFe_{(2n-m1-m2)}M_{m1}M'_{m2}O_{19}$ (mix composition)

| | n | Sr (x) | Ba (y) | La (z) | Ca (1 − x − y − z) | Fe (2n − m1 − m2) | Co (m1) | Cr (m2) | Sr + Ba (x + y) | Co + Cr (m1 + m2) | Ba/(Sr + Ba) {y/(x + y)} | (Sr + Ba)/ (Co + Cr) {(x + y)/ (m1 + m2)} |
|---|---|---|---|---|---|---|---|---|---|---|---|---|
| Ex. 3 | 5.4 | 0.180 | 0.020 | 0.400 | 0.400 | 10.430 | 0.350 | 0.020 | 0.20 | 0.37 | 0.10 | 0.54 |
| Ex. 4 | 5.4 | 0.140 | 0.030 | 0.440 | 0.390 | 10.395 | 0.380 | 0.025 | 0.17 | 0.41 | 0.18 | 0.42 |
| Ex. 5 | 5.4 | 0.100 | 0.050 | 0.450 | 0.400 | 10.459 | 0.310 | 0.030 | 0.15 | 0.34 | 0.33 | 0.44 |
| Ex. 6 | 5.4 | 0.110 | 0.070 | 0.420 | 0.400 | 10.455 | 0.310 | 0.035 | 0.18 | 0.35 | 0.39 | 0.52 |

TABLE 7-continued $Ca_{(1-x-y-z)}Sr_xR_yA_zFe_{(2n-m1-m2)}M_{m1}M'_{m2}O_{19}$ (mix composition)

|  | n | Sr (x) | Ba (y) | La (z) | Ca (1 − x − y − z) | Fe (2n − m1 − m2) | Co (m1) | Cr (m2) | Sr + Ba (x + y) | Co + Cr (m1 + m2) | Ba/(Sr + Ba) {y/(x + y)} | (Sr + Ba)/(Co + Cr) {(x + y)/(m1 + m2)} |
|---|---|---|---|---|---|---|---|---|---|---|---|---|
| Ex. 7 | 5.4 | 0.115 | 0.060 | 0.435 | 0.390 | 10.410 | 0.350 | 0.040 | 0.18 | 0.39 | 0.34 | 0.45 |
| Ex. 8 | 5.4 | 0.100 | 0.070 | 0.430 | 0.400 | 10.505 | 0.250 | 0.045 | 0.17 | 0.30 | 0.41 | 0.58 |
| Ex. 9 | 5.4 | 0.130 | 0.080 | 0.400 | 0.390 | 10.400 | 0.350 | 0.050 | 0.21 | 0.40 | 0.38 | 0.53 |
| Ex. 10 | 5.4 | 0.105 | 0.085 | 0.420 | 0.390 | 10.395 | 0.350 | 0.055 | 0.19 | 0.41 | 0.45 | 0.47 |
| Ex. 11 | 5.4 | 0.155 | 0.050 | 0.420 | 0.375 | 10.465 | 0.275 | 0.060 | 0.21 | 0.34 | 0.24 | 0.61 |
| Ex. 12 | 5.4 | 0.150 | 0.050 | 0.400 | 0.400 | 10.430 | 0.350 | 0.020 | 0.20 | 0.37 | 0.25 | 0.54 |
| Ex. 13 | 5.4 | 0.115 | 0.080 | 0.430 | 0.375 | 10.475 | 0.300 | 0.025 | 0.20 | 0.33 | 0.41 | 0.60 |
| Ex. 14 | 5.4 | 0.130 | 0.050 | 0.430 | 0.390 | 10.420 | 0.350 | 0.030 | 0.18 | 0.38 | 0.28 | 0.47 |
| Ex. 15 | 5.4 | 0.165 | 0.060 | 0.400 | 0.375 | 10.445 | 0.320 | 0.035 | 0.23 | 0.36 | 0.27 | 0.63 |
| Ex. 16 | 5.4 | 0.140 | 0.050 | 0.410 | 0.400 | 10.480 | 0.280 | 0.040 | 0.19 | 0.32 | 0.26 | 0.59 |
| Ex. 17 | 5.4 | 0.180 | 0.020 | 0.410 | 0.390 | 10.455 | 0.300 | 0.045 | 0.20 | 0.35 | 0.10 | 0.58 |
| Ex. 18 | 5.4 | 0.140 | 0.040 | 0.430 | 0.390 | 10.420 | 0.330 | 0.050 | 0.18 | 0.38 | 0.22 | 0.47 |
| Ex. 19 | 5.4 | 0.150 | 0.070 | 0.400 | 0.380 | 10.395 | 0.350 | 0.055 | 0.22 | 0.41 | 0.32 | 0.54 |
| Ex. 20 | 5.4 | 0.140 | 0.050 | 0.400 | 0.410 | 10.490 | 0.250 | 0.060 | 0.19 | 0.31 | 0.26 | 0.61 |
| Ex. 21 | 5.4 | 0.145 | 0.080 | 0.400 | 0.375 | 10.383 | 0.350 | 0.067 | 0.23 | 0.42 | 0.36 | 0.54 |
| C. E. 5 | 5.4 | 0.085 | 0.140 | 0.400 | 0.375 | 10.330 | 0.330 | 0.140 | 0.23 | 0.47 | 0.62 | 0.48 |
| C. E. 6 | 5.4 | 0.095 | 0.130 | 0.400 | 0.375 | 10.340 | 0.330 | 0.130 | 0.23 | 0.46 | 0.58 | 0.49 |
| C. E. 7 | 5.4 | 0.105 | 0.120 | 0.400 | 0.375 | 10.350 | 0.330 | 0.120 | 0.23 | 0.45 | 0.53 | 0.50 |
| C. E. 8 | 5.4 | 0.115 | 0.110 | 0.400 | 0.375 | 10.370 | 0.330 | 0.100 | 0.23 | 0.43 | 0.49 | 0.52 |
| C. E. 9 | 5.4 | 0.125 | 0.100 | 0.400 | 0.375 | 10.380 | 0.330 | 0.090 | 0.23 | 0.42 | 0.44 | 0.54 |
| C. E. 10 | 5.4 | 0.130 | 0.095 | 0.400 | 0.375 | 10.385 | 0.330 | 0.085 | 0.23 | 0.42 | 0.42 | 0.54 |
| C. E. 11 | 5.4 | 0.085 | 0.140 | 0.400 | 0.375 | 10.380 | 0.330 | 0.090 | 0.23 | 0.42 | 0.62 | 0.54 |
| C. E. 12 | 5.4 | 0.095 | 0.130 | 0.400 | 0.375 | 10.370 | 0.330 | 0.100 | 0.23 | 0.43 | 0.58 | 0.52 |
| C. E. 13 | 5.4 | 0.105 | 0.120 | 0.400 | 0.375 | 10.360 | 0.330 | 0.110 | 0.23 | 0.44 | 0.53 | 0.51 |
| C. E. 14 | 5.4 | 0.115 | 0.110 | 0.400 | 0.375 | 10.350 | 0.330 | 0.120 | 0.23 | 0.45 | 0.49 | 0.50 |
| C. E. 15 | 5.4 | 0.135 | 0.090 | 0.400 | 0.375 | 10.340 | 0.330 | 0.130 | 0.23 | 0.46 | 0.40 | 0.49 |

TABLE 8

$Ca_{(1-x-y-z)}Sr_xR_yA_zFe_{(2n-m1-m2)}M_{m1}M'_{m2}O_{19}$ (sintered magnet composition)

|  | n | Sr (x) | Ba (y) | La (z) | Ca (1 − x − y − z) | Fe (2n − m1 − m2) | Co (m1) | Cr (m2) | Sr + Ba (x + y) | Co + Cr (m1 + m2) | Ba/(Sr + Ba) {y/(x + y)} | (Sr + Ba)/(Co + Cr) {(x + y)/(m1 + m2)} |
|---|---|---|---|---|---|---|---|---|---|---|---|---|
| Ex. 3 | 4.88 | 0.163 | 0.018 | 0.388 | 0.431 | 9.420 | 0.316 | 0.018 | 0.18 | 0.33 | 0.10 | 0.54 |
| Ex. 4 | 4.88 | 0.126 | 0.027 | 0.424 | 0.422 | 9.385 | 0.343 | 0.023 | 0.15 | 0.37 | 0.18 | 0.42 |
| Ex. 5 | 4.87 | 0.090 | 0.045 | 0.433 | 0.431 | 9.442 | 0.280 | 0.028 | 0.14 | 0.31 | 0.33 | 0.44 |
| Ex. 6 | 4.88 | 0.099 | 0.063 | 0.406 | 0.431 | 9.439 | 0.280 | 0.032 | 0.16 | 0.31 | 0.39 | 0.52 |
| Ex. 7 | 4.87 | 0.104 | 0.054 | 0.420 | 0.422 | 9.398 | 0.316 | 0.036 | 0.16 | 0.35 | 0.34 | 0.45 |
| Ex. 8 | 4.87 | 0.090 | 0.063 | 0.415 | 0.431 | 9.483 | 0.226 | 0.041 | 0.15 | 0.27 | 0.41 | 0.58 |
| Ex. 9 | 4.88 | 0.117 | 0.072 | 0.388 | 0.422 | 9.390 | 0.316 | 0.045 | 0.19 | 0.36 | 0.38 | 0.53 |
| Ex. 10 | 4.87 | 0.095 | 0.077 | 0.406 | 0.422 | 9.384 | 0.316 | 0.050 | 0.17 | 0.37 | 0.45 | 0.47 |
| Ex. 11 | 4.88 | 0.140 | 0.045 | 0.406 | 0.409 | 9.448 | 0.248 | 0.054 | 0.19 | 0.30 | 0.24 | 0.61 |
| Ex. 12 | 4.88 | 0.135 | 0.045 | 0.388 | 0.431 | 9.418 | 0.316 | 0.018 | 0.18 | 0.33 | 0.25 | 0.54 |
| Ex. 13 | 4.87 | 0.104 | 0.072 | 0.415 | 0.409 | 9.455 | 0.271 | 0.023 | 0.18 | 0.29 | 0.41 | 0.60 |
| Ex. 14 | 4.88 | 0.117 | 0.045 | 0.415 | 0.422 | 9.407 | 0.316 | 0.027 | 0.16 | 0.34 | 0.28 | 0.47 |
| Ex. 15 | 4.88 | 0.149 | 0.054 | 0.388 | 0.409 | 9.430 | 0.289 | 0.032 | 0.20 | 0.32 | 0.27 | 0.63 |
| Ex. 16 | 4.88 | 0.126 | 0.045 | 0.397 | 0.431 | 9.463 | 0.253 | 0.036 | 0.17 | 0.29 | 0.26 | 0.59 |
| Ex. 17 | 4.88 | 0.163 | 0.018 | 0.397 | 0.422 | 9.441 | 0.271 | 0.041 | 0.18 | 0.31 | 0.10 | 0.58 |
| Ex. 18 | 4.88 | 0.126 | 0.036 | 0.415 | 0.422 | 9.408 | 0.298 | 0.045 | 0.16 | 0.34 | 0.22 | 0.47 |
| Ex. 19 | 4.88 | 0.135 | 0.063 | 0.388 | 0.413 | 9.385 | 0.316 | 0.050 | 0.20 | 0.37 | 0.32 | 0.54 |
| Ex. 20 | 4.88 | 0.126 | 0.045 | 0.388 | 0.440 | 9.473 | 0.226 | 0.054 | 0.17 | 0.28 | 0.26 | 0.61 |
| Ex. 21 | 4.88 | 0.131 | 0.072 | 0.388 | 0.409 | 9.374 | 0.316 | 0.060 | 0.20 | 0.38 | 0.36 | 0.54 |
| C. E. 5 | 4.87 | 0.077 | 0.126 | 0.388 | 0.409 | 9.323 | 0.298 | 0.126 | 0.20 | 0.42 | 0.62 | 0.48 |
| C. E. 6 | 4.87 | 0.086 | 0.117 | 0.388 | 0.409 | 9.333 | 0.298 | 0.117 | 0.20 | 0.42 | 0.58 | 0.49 |
| C. E. 7 | 4.87 | 0.095 | 0.108 | 0.388 | 0.409 | 9.342 | 0.298 | 0.108 | 0.20 | 0.41 | 0.53 | 0.50 |
| C. E. 8 | 4.87 | 0.104 | 0.099 | 0.388 | 0.409 | 9.360 | 0.298 | 0.090 | 0.20 | 0.39 | 0.49 | 0.52 |
| C. E. 9 | 4.87 | 0.113 | 0.090 | 0.388 | 0.409 | 9.370 | 0.298 | 0.081 | 0.20 | 0.38 | 0.44 | 0.54 |
| C. E. 10 | 4.87 | 0.117 | 0.086 | 0.388 | 0.409 | 9.375 | 0.298 | 0.077 | 0.20 | 0.37 | 0.42 | 0.54 |
| C. E. 11 | 4.87 | 0.077 | 0.126 | 0.388 | 0.409 | 9.368 | 0.298 | 0.081 | 0.20 | 0.38 | 0.62 | 0.54 |
| C. E. 12 | 4.87 | 0.086 | 0.117 | 0.388 | 0.409 | 9.360 | 0.298 | 0.090 | 0.20 | 0.39 | 0.58 | 0.52 |
| C. E. 13 | 4.87 | 0.095 | 0.108 | 0.388 | 0.409 | 9.351 | 0.298 | 0.099 | 0.20 | 0.40 | 0.53 | 0.51 |
| C. E. 14 | 4.87 | 0.104 | 0.099 | 0.388 | 0.409 | 9.343 | 0.298 | 0.108 | 0.20 | 0.41 | 0.49 | 0.50 |
| C. E. 15 | 4.87 | 0.122 | 0.081 | 0.388 | 0.409 | 9.334 | 0.298 | 0.117 | 0.20 | 0.42 | 0.40 | 0.49 |

As shown in Table 9 and FIGS. 17 to 19, the sintered magnets prepared in Examples 3 to 21 exhibited significantly improved magnetic properties as compared to those prepared in Comparative Examples 5 to 15.

TABLE 9

|  | Br(G) | bHc(Oe) | iHc(Oe) | Hk(Oe) | B.Hmax (MGOe) | Hk/iHc (%) | Br + 1/3(iHc) * (Hk/iHc) |
|---|---|---|---|---|---|---|---|
| Ex. 3 | 4615 | 4285 | 4860 | 4626 | 5.22 | 95.2 | 5,936 |
| Ex. 4 | 4633 | 4298 | 4987 | 4752 | 5.25 | 94.8 | 5,968 |
| Ex. 5 | 4620 | 4313 | 5072 | 4792 | 5.24 | 94.5 | 5,964 |
| Ex. 6 | 4618 | 4284 | 4877 | 4618 | 5.23 | 94.7 | 5,913 |
| Ex. 7 | 4597 | 4280 | 4792 | 4605 | 5.23 | 96.1 | 5,953 |
| Ex. 8 | 4591 | 4263 | 4904 | 4676 | 5.19 | 95.4 | 5,939 |
| Ex. 9 | 4587 | 4254 | 4736 | 4517 | 5.20 | 96.2 | 5,931 |
| Ex. 10 | 4585 | 4245 | 4709 | 4434 | 5.21 | 95.4 | 5872 |
| Ex. 11 | 4578 | 4238 | 4952 | 4683 | 5.20 | 94.8 | 5,905 |
| Ex. 12 | 4618 | 4262 | 4733 | 4514 | 5.22 | 95.4 | 5,911 |
| Ex. 13 | 4616 | 4235 | 4713 | 4438 | 5.23 | 95.3 | 5896 |
| Ex. 14 | 4625 | 4286 | 4725 | 4503 | 5.29 | 96.3 | 5,971 |
| Ex. 15 | 4608 | 4218 | 4827 | 4592 | 5.22 | 95.1 | 5,912 |
| Ex. 16 | 4585 | 4260 | 4806 | 4585 | 5.26 | 95.3 | 5,896 |
| Ex. 17 | 4615 | 4258 | 4825 | 4587 | 5.23 | 95.4 | 5,937 |
| Ex. 18 | 4606 | 4284 | 4947 | 4726 | 5.20 | 94.3 | 5,900 |
| Ex. 19 | 4575 | 4301 | 5174 | 4834 | 5.20 | 94.4 | 5,947 |
| Ex. 20 | 4587 | 4306 | 5134 | 4805 | 5.18 | 93.6 | 5,895 |
| Ex. 21 | 4590 | 4290 | 5288 | 4878 | 5.20 | 92.9 | 5,902 |
| C. E. 5 | 4375 | 4030 | 4870 | 4023 | 4.55 | 82.6 | 4,955 |
| C. E. 6 | 4416 | 4077 | 4820 | 4165 | 4.81 | 86.4 | 5,204 |
| C. E. 7 | 4450 | 4155 | 4754 | 4203 | 5.05 | 88.4 | 5,335 |
| C. E. 8 | 4493 | 4191 | 4850 | 4263 | 5.10 | 87.9 | 5,370 |
| C. E. 9 | 4550 | 4255 | 4955 | 4499 | 5.11 | 90.8 | 5,631 |
| C. E. 10 | 4562 | 4268 | 4965 | 4543 | 5.12 | 91.5 | 5,689 |
| C. E. 11 | 4425 | 4086 | 4785 | 4168 | 4.82 | 87.1 | 5,243 |
| C. E. 12 | 4457 | 4120 | 4965 | 4339 | 5.02 | 87.4 | 5,342 |
| C. E. 13 | 4496 | 4186 | 4884 | 4342 | 5.05 | 88.9 | 5,444 |
| C. E. 14 | 4520 | 4212 | 4737 | 4320 | 5.09 | 91.2 | 5,562 |
| C. E. 15 | 4546 | 4245 | 4870 | 4407 | 5.11 | 90.5 | 5,583 |

While the embodiments of the subject invention have been described and illustrated, it is obvious that various changes and modifications can be made therein without departing from the spirit of the present invention which should be limited only by the scope of the appended claims.

What is claimed is:

1. A ferrite magnetic material comprising a primary phase of a hexagonal magnetoplumbite ferrite, the primary phase having a composition represented by formula (I):

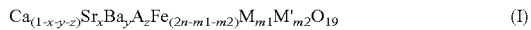

$$Ca_{(1-x-y-z)}Sr_xBa_yA_zFe_{(2n-m1-m2)}M_{m1}M'_{m2}O_{19} \quad (I)$$

wherein,

A is bismuth (Bi) and at least one element selected from the group consisting of La, Nd, Pr, and Sm, with La being essentially contained in A;

M is at least one element selected from the group consisting of Co, Mn, Ni, and Zn, with Co being essentially contained in M;

M' is Cr;

$0.02 \leq x \leq 0.3$;

$0.02 \leq y \leq 0.09$;

$0.35 \leq z \leq 0.5$;

$0.2 \leq m1 \leq 0.4$;

$0.02 \leq m2 \leq 0.07$;

$9.0 \leq 2n \leq 11.0$, wherein the values of x, y and m2 satisfy the conditions of $0.1 \leq x+y < 0.3$, and $0.04 \leq y+m2 \leq 0.16$, and wherein the values of x, y, z, m1 and m2 satisfy the conditions of $0.09 \leq y/(x+y) \leq 0.5$, $0.3 \leq (x+y)/(m1+m2) \leq 0.8$, and $1.4 \leq (1-z)/(m1+m2) \leq 1.6$.

2. The ferrite magnetic material of claim 1, wherein for Strontium Sr), $0.02 \leq x \leq 0.163$.

3. The ferrite magnetic material of claim 1, wherein for Calcium (Ca), $0.409 \leq 1-x-y-z \leq 0.55$.

* * * * *